US007992199B1

(12) United States Patent
Winick et al.

(10) Patent No.: US 7,992,199 B1
(45) Date of Patent: Aug. 2, 2011

(54) METHOD FOR PERMITTING TWO PARTIES TO ESTABLISH CONNECTIVITY WITH BOTH PARTIES BEHIND FIREWALLS

(75) Inventors: Steven J. Winick, Woodmere, NY (US); William R. Blum, Huntington Station, NY (US); Piotr Romanczyk, Huntington Station, NY (US)

(73) Assignee: Honeywell International Inc., Morristown, NJ (US)

( * ) Notice: Subject to any disclaimer, the term of this patent is extended or adjusted under 35 U.S.C. 154(b) by 2346 days.

(21) Appl. No.: 10/749,651

(22) Filed: Dec. 31, 2003

(51) Int. Cl.
*G06F 9/00* (2006.01)

(52) U.S. Cl. .............. 726/11; 726/12; 726/13; 726/14; 709/225

(58) Field of Classification Search .............. 725/11–14; 713/153
See application file for complete search history.

(56) References Cited

U.S. PATENT DOCUMENTS

| 4,409,590 A | 10/1983 | Baker | 340/553 |
| 4,937,855 A | 6/1990 | McNab et al. | 379/103 |
| 5,195,126 A | 3/1993 | Carrier et al. | 379/45 |
| 5,604,791 A | 2/1997 | Lee | 379/67 |
| 5,835,726 A * | 11/1998 | Shwed et al. | 709/229 |
| 5,940,474 A | 8/1999 | Ruus | 379/49 |
| 5,986,571 A | 11/1999 | Flick | 340/825.72 |
| 6,430,268 B1 | 8/2002 | Petite | 379/39 |
| 6,442,241 B1 | 8/2002 | Tsumpes | 379/45 |
| 6,931,529 B2 * | 8/2005 | Kunzinger | 713/153 |
| 6,981,278 B1 * | 12/2005 | Minnig et al. | 726/12 |
| 7,058,973 B1 * | 6/2006 | Sultan | 726/12 |
| 7,480,936 B2 * | 1/2009 | Lyon et al. | 726/11 |
| 2001/0034842 A1 * | 10/2001 | Chacko et al. | 713/201 |
| 2001/0056550 A1 * | 12/2001 | Lee | 713/201 |
| 2002/0103998 A1 * | 8/2002 | DeBruine | 713/153 |
| 2002/0120760 A1 * | 8/2002 | Kimchi et al. | 709/230 |
| 2002/0152373 A1 * | 10/2002 | Sun et al. | 713/150 |
| 2002/0186683 A1 * | 12/2002 | Buck et al. | 370/352 |
| 2003/0195982 A1 | 10/2003 | Motoyama et al. | 709/238 |

FOREIGN PATENT DOCUMENTS

| GB | 2 325 548 | 11/1998 |
| WO | WO95/01041 | 1/1995 |

* cited by examiner

*Primary Examiner* — Kambiz Zand
*Assistant Examiner* — Amare Tabor
(74) *Attorney, Agent, or Firm* — Husch Blackwell

(57) ABSTRACT

A communications scheme enables a central communications station to assist two communications systems located behind firewalls that prevent communication initiated from an external data network to establish direct communication with each other. In one embodiment, the systems separately establish communications with the central communications station and obtain from it the connection information (e.g., IP address, port, etc.) of the other. The systems then directly communicate with each other using the obtained connection information while pretending to be the central communications station. In another embodiment in which the firewalls include NAT devices that implement network address translation, the systems exchange connection information for establishing a new connection through the central communications station and then complete a three-way handshake with the assistance of the central communications station, thereby allowing the central communications station to remove itself from the communication.

20 Claims, 8 Drawing Sheets

METHOD FOR PERMITTING TWO PARTIES TO ESTABLISH CONNECTIVITY WITH BOTH PARTIES BEHIND FIREWALLS

BACKGROUND OF THE INVENTION

This invention relates to methods for enabling communication between communications systems in an open data network. In particular, this invention relates to methods for establish connectivity between two secure communications systems located behind firewalls.

Recently, it has become common for communications systems having some processing capabilities and access to an open data network (i.e., the Internet) to communicate with each other through the network. Typically, the communications systems transmit data to each other in packets, which are delivered using a suite of standard protocols known as Transport Control Protocol/Internet Protocol (TCP/IP). It should be understood by one skilled in the art that these packets may include data packets, control packets such as TCP packets or other types of packets defined by the relevant protocol for performing similar functions, and any other suitable packets.

The IP is a network layer protocol that facilitates the transmission of packets between remotely-located communications systems through the use of an IP address that is unique to each remote system. The TCP protocol is a transport-layer protocol riding atop the IP. The TCP provides a full-duplex byte stream between applications, whether they reside on the same machine or on remotely-located machines. The TCP ensures that transmitted packets are received in the same order in which they were transmitted.

One of the most important features of TCP/IP is that it is an "open" protocol that enables anyone who wishes to implement it to do so. While TCP/IP makes it relatively simple for systems to transmit packets to each other, it does not provide a robust mechanism for authenticating these packets. Therefore, communications systems that use TCP/IP to communicate with remote systems in the open data network run the risk of inadvertently accepting malicious packets from unreliable remote sources.

One way to minimize such risks is through the implementation of a firewall. A firewall is a security system that acts as a protective boundary between one or more communications systems in a "private" network and the open data network. Typically, the firewall monitors all aspects of the communications that are transmitted between the private network and the open data network. More specifically, the firewall inspects the source and destination addresses of each packet that passes through. To prevent unsolicited traffic from the open data network from entering the private network, the firewall keeps a table of all communications that have originated from the private communications systems. All inbound traffic from the open data network is compared against the entries in the table. The firewall permits only inbound traffic that have a matching entry in the table indicating that the communication exchange was initiated from a private communications system within the firewall to pass. The firewall drops all communications that originate from a source that is outside of the firewall, thus preventing common hacking attempts. Most of the time, the firewall does not inform the private communications system before discarding unsolicited communications.

Most communications systems connect to the open data network through a shared gateway (e.g., provided by an Internet Service Provider). These shared gateways often provide Network Address Translation (NAT), an Internet Engineering Task Force (IETF) standard, as a means of connecting multiple communications systems on a private network to the open network using a single shared public IP address. Although NAT is mainly deployed to solve the IP address scarcity problem, it also provides a layer of obscurity for the communications systems in the private network. Because communications systems located outside of the private network can only obtain the public IP address of the NAT device providing NAT, the private address of each individual communications system in the private network is protected. Although NAT is not the same thing as a firewall, they are often provided in conjunction with each other by the gateway server.

With increased security provided by the firewalls and NAT devices comes decreased accessibility to communications systems. It is especially problematic for communications systems located behind firewalls that prevent communications that have originated from outside the firewalls to establish direct communication with other remote systems.

Therefore, it is desirable to provide a communications scheme that enables two communications systems, each located behind a firewall, to directly communicate with each other.

It is also desirable to provide such a direct communications scheme between communications systems located behind firewalls that additionally include a network address translation device for implementing network address translation (NAT).

SUMMARY OF THE INVENTION

It is an object of this invention to provide a communications scheme that enables two communications systems, each located behind a firewall, to directly communicate with each other.

It is also an object of this invention to provide such a direct communications scheme between communications systems located behind firewalls that additionally include a network address translation device for implementing network address translation (NAT).

In one embodiment of the invention, a communications scheme enables a trusted central communications station to assist two remote communications systems, located behind firewalls that prevent communication initiated from an external data network, to establish direct communication with each other. According to this embodiment, each remote communications system separately initiates connection with the central communications station and obtains from it the connection information (IP address, port, etc.) of the other remote communications system. The remote communications systems then transmit data to each other using the central communications station's connection information as their data's source information. Through this method of disguising the true source of their packets, each communications system effectively "spoof" the other into believing that the data is coming from the central communications station with which the communications system has an existing secure connection.

In another embodiment of the invention in which the firewalls additionally include a NAT device for implementing network address translation, the remote communications systems, through the central communications station, exchange connection information for establishing a new TCP connection. The remote systems then establish an entirely separate TCP connection with each other by completing a three-way TCP handshake with the assistance of the central communications station.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention recognizes that communication functions such as Internet, electronic mail, and other public data network functions are made readily available to users of communications systems having some processing capabilities and network access (e.g., personal computers, digital televisions, wireless devices, premises security systems, etc.). The present invention also recognizes that communications systems may wish to securely communicate with each other even though the systems are often ignorant of the connection information of other systems with which they wish to communicate. The present invention additionally recognizes that many communications system are configured to securely communication with at least one central communications stations (e.g., a premises security system and a central station), which has the ability to securely communicate with multiple remote communications systems.

In accordance with one aspect of the present invention, an Internet connection between a remote communications system and a central communications station can be used for reliable secure communications. Both of the problems of security and authentication may be solved by using shared private key encryption. For example, each remote communications system may be provided with a unique private key. The same private key may be known by the central communications station. When the central communications station communicates with the remote communications system, it is able to decrypt the communication with the private key associated with that remote communications system thus ensuring that the communication is secure. Other forms of authentication, such as Secure Socket Layer (SSL), may also be implemented by the central communications station and the remote communications system to ensure secure communication.

Because secure communication may be ensured between a remote communications system and a central communications station, which communicates securely with multiple remote communications systems, the central communications station may assist multiple remote communications systems to communicate with each other.

The invention will now be described with reference to FIGS. 1-6.

Figure 1:
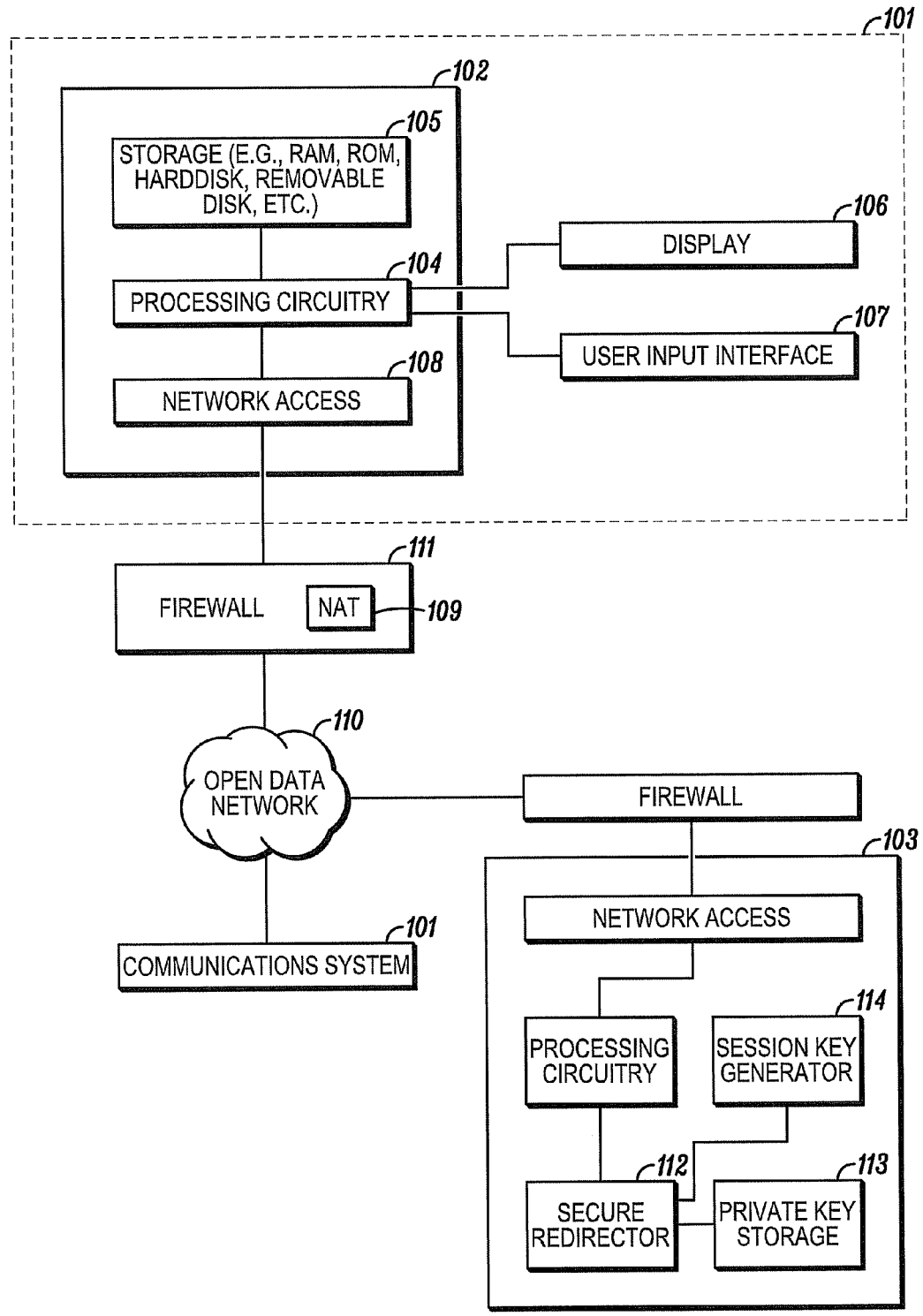
FIG. 1 is a simplified schematic diagram of a communications scheme in which remote communications systems communicate with a central communications station via an open data network in accordance with the present invention.

A generalized communications scheme that enables a communications system 101 having control circuitry 102 to communicate with a secure central communications station 103 according to the present invention is shown in FIG. 1. Control circuitry 102 may be based on any suitable processing circuitry 104 such as processing circuitry based on one or more microprocessors, microcontrolcontrollers, digital signal processors, programmable logic devices, etc. Memory (e.g., random-access memory and read-only memory), hard drives, DVD drives, CD drives, or any other suitable memory or storage devices may be provided as storage 105 that is part of control circuitry 102. In accordance with one embodiment of the invention, memory 105 may store a private key, which may be used to initiate secure communication with central communications station 103.

Information generated by processing circuitry 104 may be displayed to a user on display 106. Display 106 may be a monitor, a television, or any other suitable equipment for displaying visual images.

A user may control the control circuitry 106 using user input interface 107. The user input interface 107 may be any suitable user interface, such as one or more of a mouse, trackball, keypad, keyboard, touch screen, touch pad, voice recognition interface, remote control, or any other suitable input device.

Control circuitry may also include network access 108 for connecting to a private network and/or an open data network 110 such as the Internet. Access by communications system 101 to open data network 110 may be controlled by firewall 111. Firewall 111 may be any combination of hardware and software suitable for filtering traffic between communications system 101 and open data network 110. According to this embodiment, firewall 110 allows outbound data traffic originated from communications system 101, as well as inbound data traffic responsive to those outbound data traffic, to pass, while preventing inbound data traffic associated with communications initiated from open data network 110 from reaching communications system 101.

In accordance with one embodiment of the invention, firewall 111 may also include Network Access Translation (NAT) device 109. NAT device 109 may be any suitable combination of hardware and software for translating private address information associated with outbound data traffic from communications system 101 into public address information before sending the data traffic to open data network 110. Functions of NAT device 109 will be discussed in more detail in connection with FIG. 3.

Central communications station 103 may be a system that is similar in basic configuration to communications system 101. Central communications station 103 may additionally include resources that enable it to communicate securely with multiple remotely-located communications systems 101 where each communications system 101 is provided with the necessary connection information (e.g., IP address, port address, etc.) to initiate communication with central communications station 103. According to one embodiment, central communications station 103 may include secure redirectors 112. Secure redirector 112 may have access to private key storage 113, which, according to one embodiment, may store a private key for each communications system 101 with which central communications station 103 communicates. Redirectors 112 may perform the encryption and decryption using those stored keys to authenticate communications systems 101 having corresponding private keys. According to another embodiment, central communications station 103 may securely communicate with communications systems 101 using other known methods such as through the implementation of Secure Sockets Layer (SSL).

In one embodiment of the present invention, communications system 101 may be a premises security system having monitoring and alarm capabilities. In such an embodiment, central communication station 103 may act as a central station to which the premises security system may report emergencies as well as monitoring information. If a premises system includes a video camera for monitoring the premises, central communications station 103 may allow a user away from the premises at another communications system 101 to securely access video feed from the video camera, for example, by using redirector 112 to relay the video feed to the user. A premises security system of this type is disclosed in copending, commonly-assigned U.S. patent application Ser. No. 09/805,864, which is hereby incorporated by reference herein in its entirety.

In another embodiment, central communications system 103 may enable two communications systems 101, each secure behind its respective associated firewall and ignorant of the other's connection information (e.g., IP address, port address, etc.), to communicate with each other by allow each remote system 101 to separately initiate secure communication with central communications station 103 (e.g., using secure methods mentioned above) and then relaying their messages to each other using secure redirectors 112.

While such a three-way relay scheme ensures security, it may also place a strain on bandwidth available to the central communications station, especially when a large number of subscribers use the relay service at one time or when large amounts of data such as video are transmitted between communications system.

Figure 2:
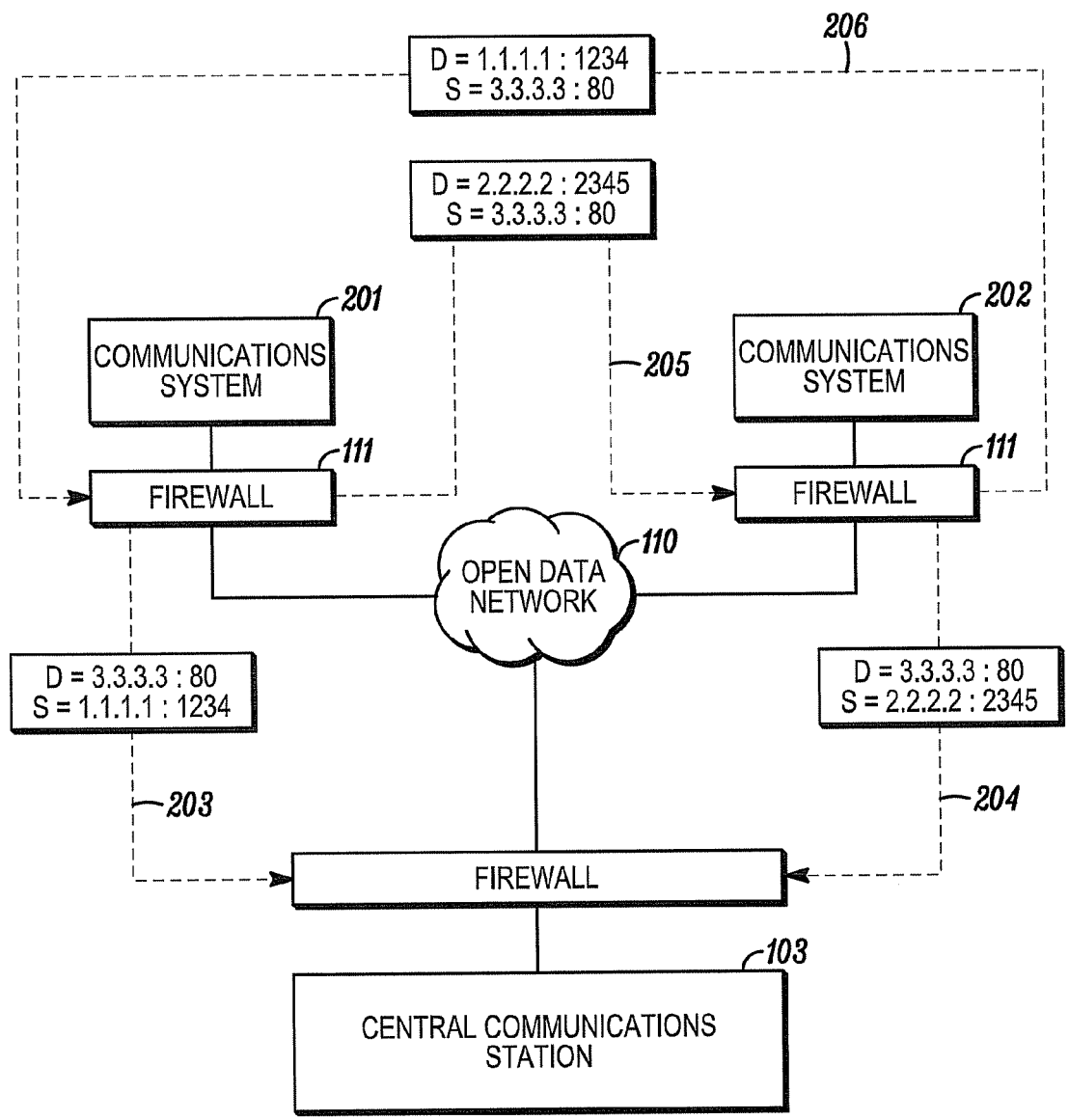
FIG. 2 is a simplified schematic diagram of a communications scheme that enables two remote communications systems located behind firewalls to communicate directly with each other according to the invention.

In accordance with the present invention, central communications station 103 reduces the strain on bandwidth by removing itself from, or reducing its participation in, the three-way conversation after helping the communications systems establish secure connection with each other. FIG. 2 shows a simplified schematic diagram of one preferred embodiment in which two communications systems 201 and 202 communicate directly with each other without using redirectors 112 to relay the messages. Consistent with the description in FIG. 1, both communications systems 201 and 202 (based on communications system 101) are located behind firewalls that only permit communications (e.g., TCP connections) originated from within the firewalls. In this embodiment, neither communications systems is associated with a NAT device 109 that provides network address translation.

To initiate communication with communications system 202, communications system 201 first initiates a secure TCP connection 203 with central communications station 103, and advises central communications station 103 that it wishes to communication with remote communications system 202. Central communications station 103 authenticates communications system 201, for example, by comparing its private key with an appropriate key from private key storage 113 or by using any other suitable authentication methods. Central communications station 103 then obtains communications system 201's connection information, including its IP address and port address (e.g., 1.1.1.1:1234), and waits for communications system 202, with whom communications system 201 wishes to communicate, to initiate communication with it. Because central communications station 103 must wait for remote communications system 202 to initiate communication with it, the present invention works most efficiently in a communications scheme where remote communications system 202 frequently establishes communication with central communications station 113 (e.g., to report security status).

When communications system 202 independently establishes secure TCP connection 204 with central communications station 103, central communications station 103 sends communications system 201's connection information (e.g., 1.1.1.1:1234) and a session key for its session with communications system 201 (e.g., generated by a session key generator 114) to communications system 202. Central communications station 103 concurrently obtains and sends communications system 202's connection information, including its IP address and port address (e.g., 2.2.2.2:2345), and its session key for its session with communications system 202 to communications system 201.

Now both communications systems 201 and 202 have the necessary connection information (IP address and port address) to directly send packets to the other. They must, however, overcome one more hurdle before direct data exchange can occur. As mentioned above, firewalls 111, behind which both communications systems 201 and 202 are located, only permit connections initiated from within the firewalls. Due to this constraint, if communications system 201 were to send packets directly to communications system 202 using its own IP address and port address as the source IP address and source port address of those packets, the packets will be dropped by firewall 111 associated with communications system 202.

According to the present invention, communications system 201 overcomes this problem by disguising its packets to communications system 202 so they appear as if they have been sent by central communications station 103. More specifically, communications system 201 sends its packets to communications system 202 using the IP address and port address of central communications station 103 (3.3.3.3:80) as their source address and port address (205). Thus, communications system 201 effectively "spoofs" communications system 202 into accepting those packets believing that they came from central communications station 103, with which it has an existing secure TCP connection. Similarly, communications system 202 transmits its packets to communications system 201 using central communications station 103's IP address and port address as the source IP address and source port address thereby "spoofing" communications system 201 into accepting its packets (206). At this point, communications systems 201 and 202 are in direct communication with each other and central communications station 103 is free to bow out.

In the above embodiment, even though both remote communications systems accept packets from a source other than central communications station 103, security is preserved because both remote communications systems have been authenticated upon their initial connections to central communications station 103.

One requirement of the above communications scheme is that each remote communications system must substitute central communications station 103's IP address and port address as the source IP and source port address of its outbound packets thereby "spoofing" the other remote communications system into accepting the packets. This requirement cannot be satisfied if either remote communications system is sitting behind a firewall that implements NAT, which automatically replaces the source IP address of an outbound packet with a public IP address assigned by the NAT device. Essentially, NAT eliminates the ability to "spoof" as described above.

A basic understanding of NAT and the three-way handshake required to establish TCP connectivity is necessary in order to fully comprehend this problem in establishing direct communication between two communications systems located behind firewalls that also implement NAT. It is understood by one skilled in the art that the term "network address translation" refers exclusively to the translation of private source IP addresses into public source IP addresses by a NAT device. When such a NAT device is used, no port translation occurs. In other words, the private source port address associated with a packet is allowed to pass through the NAT device into the open data network unchanged. It is also understood by one skilled in the art that a network address port translation (NAPT) device may be employed to perform both IP address and port address translation. When a NAPT device is used, both source IP address and source port address of a packet that passes through the NAPT device are changed before the packet is released into the open data network. Accordingly, when references are made to a NAT device in this application, the NAT device is presumed to only perform IP address translations. Separate references are made to a NAPT device when port address translation is also performed by the device.

Figure 3:
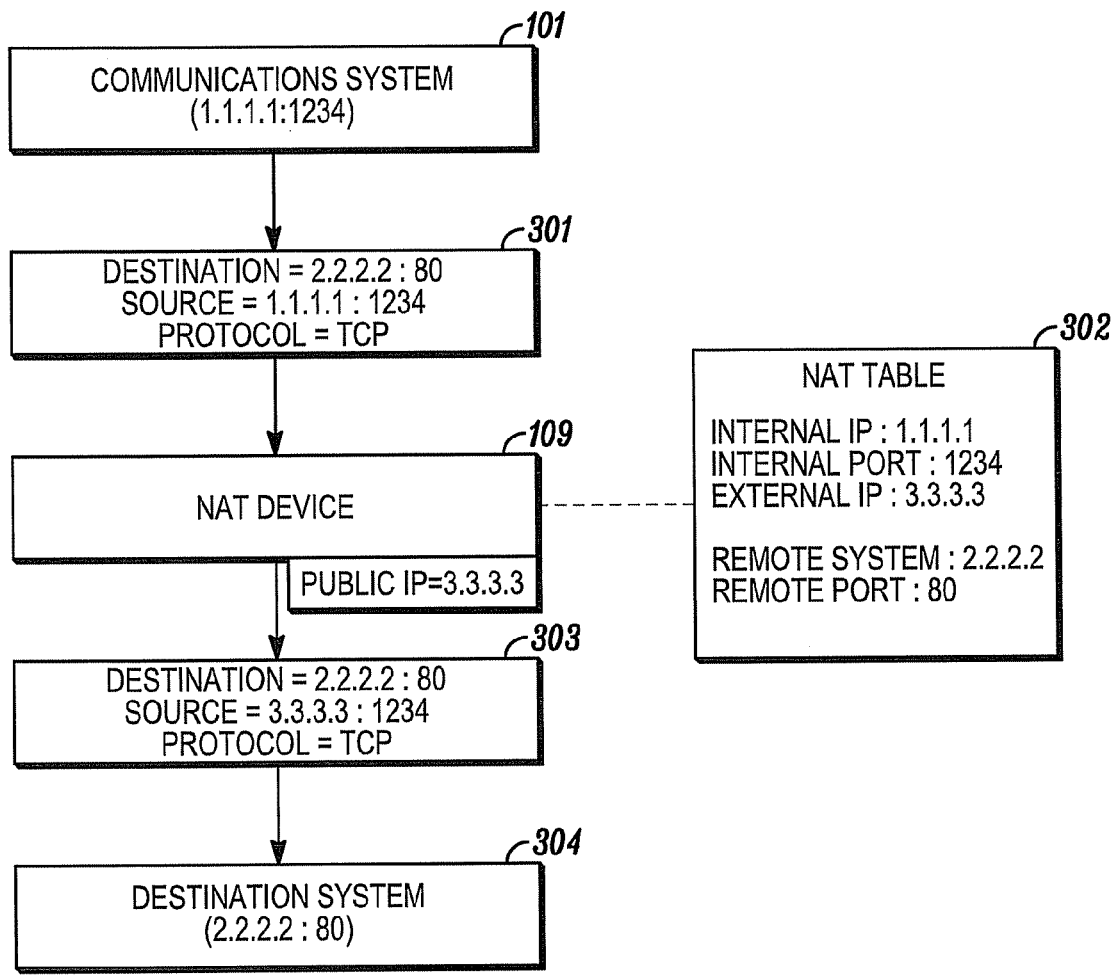
FIG. 3 is a simplified schematic diagram of the network access translation process in accordance with the present invention.

A simplified schematic diagram of network address translation (NAT) in accordance with the present invention is shown in FIG. 3. A communications system 101 and a NAT device 109 as described in accordance with FIG. 1 are shown where NAT device 109 provides network address translation for all outbound traffic originated from communications system 101. In accordance with this embodiment, a private IP address (e.g., 1.1.1.1) may either be dynamically assigned to communications system 101 through implementation of Dynamic Host Configuration Protocol (DHCP) or may be configured as a static IP address by an administrator.

When an application (e.g., an e-mail application) residing on communications system 101 wishes to communicate with another remote communications system, communications system 101 opens a socket (a software object that connects an application to a network protocol) that is associated with a source IP address (e.g., 1.1.1.1), source port address (e.g., 1234), destination IP address of the remote communications system (e.g., 2,2,2,2), destination port of the remote system, (e.g., 80), and network protocol (e.g., TCP). When the application transmits information (e.g., an e-mail message) using TCP, the source IP address and source port address are inserted into the source fields of packet 301 (e.g., generated in association with the outbound e-mail message). The destination fields of packet 301 will contain the remote system's destination IP address and destination port address. Because the e-mail is directed to a remote system located outside of the private network to which communications system 101 belongs, communications system 101 forwards the packet to NAT device 109 for IP address translation before it is sent on its way into the open data network.

NAT device 109, upon receipt of this outbound packet, creates a port mapping in its NAT table 302. The port mapping maintains information such as the destination IP address, destination port, external IP address of the NAT device, network protocol, internal IP address of communications system 101, and any other suitable information associated with the packet. NAT device 109 then translates the packet by swapping the source IP field of packet 301 from the private, internal IP address of communications system 101 to the public, external IP address of NAT device 109. The resulting packet 303 is then sent to the open data network to eventually reach destination system 304.

If a NAPT device is used in place of NAT device 109, the translation performed on packet 301 by the NAPT device may additionally include the step of swapping the source port field of packet 301 from the private, internal port address associated with communications system 101 to the public, external port address assigned by the NAPT device. Accordingly, the port mapping created for packet 301 may also include information such as the external port address of the NAPT device.

If destination system 304 sends a return packet back to communications system 101, the packet will be addressed to the external IP address (e.g., 3.3.3.3) of NAT device 109 because that is what destination system 304 obtains from the source IP field of packet 303. NAT device 109 receives this packet from destination system 304 and compares it to the port mappings in NAT table 302. If NAT device 109 finds a port mapping where the IP addresses, port addresses, and protocol match that of the inbound packet, NAT device 109 performs a reverse translation by replacing the external IP address in the destination field of the inbound packet with communications system 101's private IP address. NAT device 109 then forwards the inbound packet on the internal network to communications system 101. If, however, NAT device 109 does not find a corresponding port mapping in NAT table 302 for the inbound packet from destination system 304, NAT device 109 discards the packet.

Figure 4:
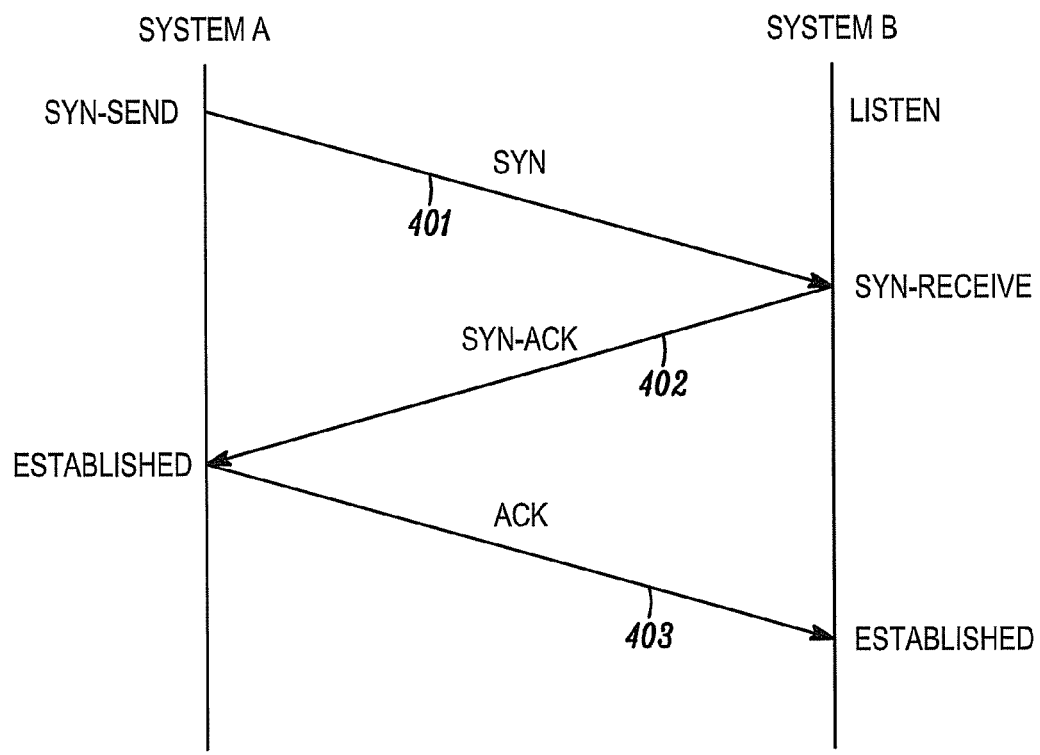
FIG. 4 is a simplified schematic diagram of a three-way TCP handshake in accordance with the present invention.

A simplified schematic diagram of a three-way TCP handshake to establish TCP connectivity in accordance with the present invention is shown in FIG. 4. As briefly mentioned above, the TCP level of the TCP/IP transport protocol is connection-oriented, which means that before any data can be transmitted, a reliable connection between the systems must be obtained and acknowledged. Specifically, TCP uses what is known as a three-way handshake to establish a connection between two remote systems wishing to communicate with each other. It should be understood by one skilled in the art that while the present invention is described primarily in connection with TCP protocols, implementation of the present invention is not limited to TCP protocols and may include any other suitable protocols for performing similar functions.

First, system A, wishing to communicate with system B, sends a control packet (e.g., a TCP packet or any other packet defined by the relevant protocol for performing similar functions) containing a specific control parameter SYN (synchronize sequence numbers) to system B (401). The parameter SYN indicates to system B that system A wishes to establish a TCP connection and to do so system B must synchronize its sequence numbers to the sequence number indicated in system A's control packet. Also wishing to communicate with system A, system B sends a control packet containing control parameters ACK (acknowledgement field significant) and SYN back to system A (402). This control packet acknowledges system A's request for synchronization and requests that system A also synchronize to system B's sequence numbers. System B additionally indicates that this acknowledgement is in response to system A's previous SYN-flagged control packet by providing in the control packet an acknowledge number that is computed by adding one to system A's sequence number received at 401.

Once system A receives the SYN-ACK-flagged control packet from system B, it sends back a final control packet containing an ACK parameter and an acknowledgement number generated by adding one to system B's sequence number (403). When system B receives this control packet, the three-way handshake is completed and a reliable TCP connection is established.

Figure 5A:
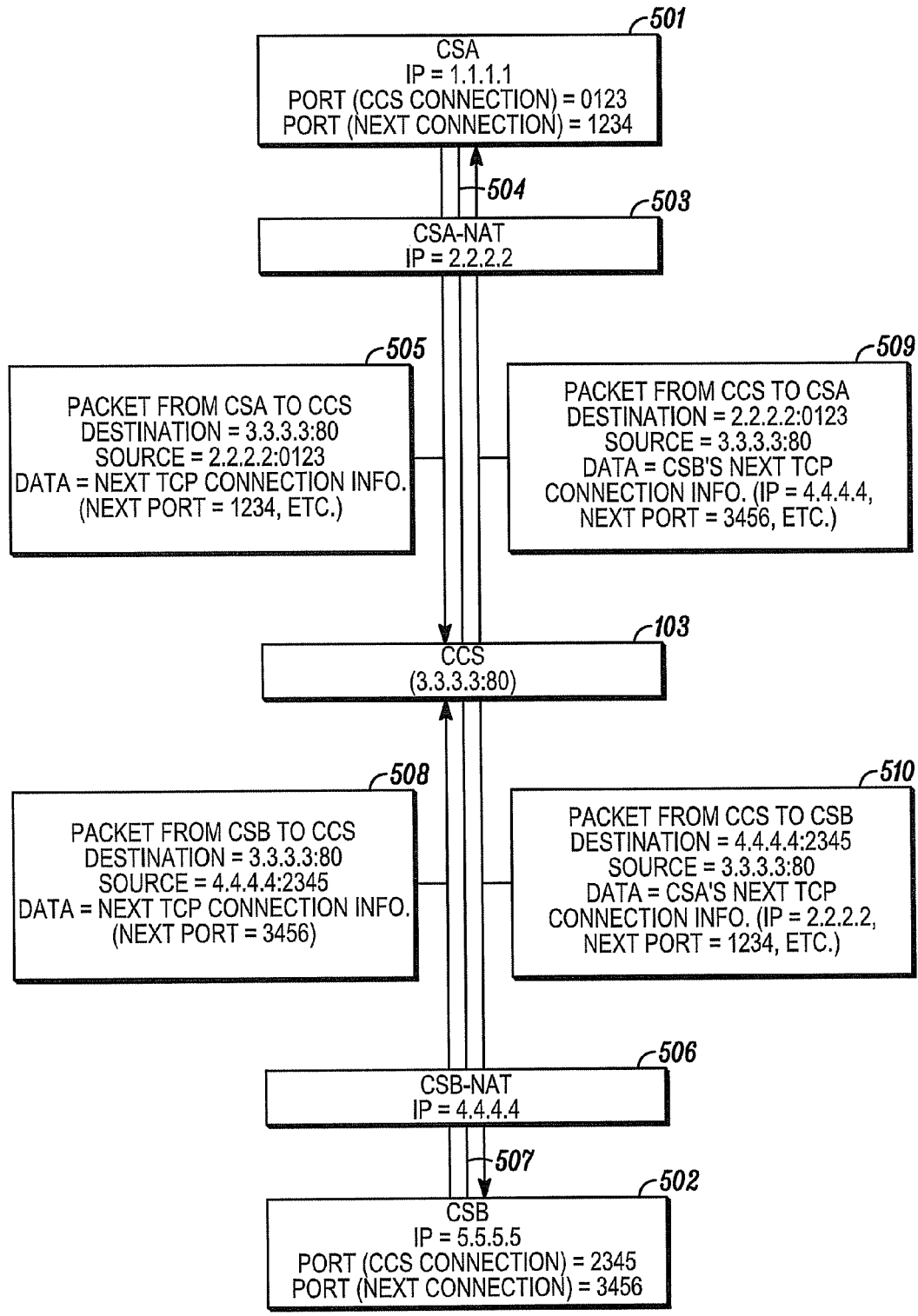
FIGS. 5A and 5B are two portions of a simplified schematic diagram of a communications scheme that enables two remote communications systems located behind firewalls that additionally include NAT devices that implement NAT to communicate directly with each other according to the invention.
Figure 5B:
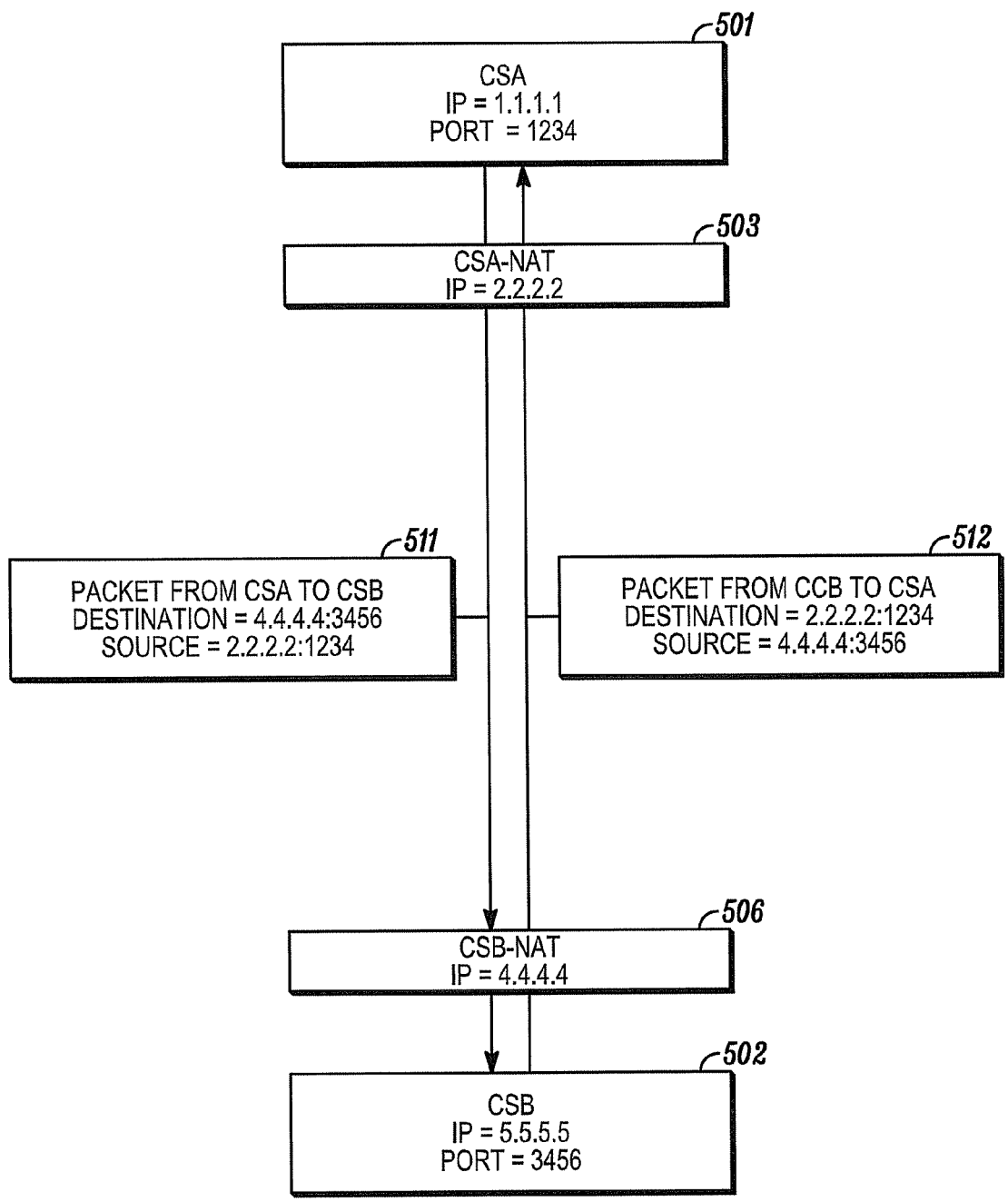

With a basic understanding of NAT and TCP handshake, it is easy to see why the "spoofing" method described above does not work when the communications systems are located behind firewalls that also implement NAT. FIGS. 5A and 5B show an alternative communications scheme that overcomes the potential problems and enables two communications systems 501 and 502, sitting behind firewalls that implement NAT, to communicate directly with each other without using the "spoofing" method. In this embodiment, each communications system 501 and 502 preferably includes a system 101.

As described in the previous communications scheme, to establish communication with another communications system, communications system 501 first initiates, through its associated NAT device 503, a full TCP connection 504 with central communications station 103. Central communications station 103 again obtains the connection information associated with communications system 501, which in this case includes a translated IP address (e.g., 2.2.2.2) provided by communications system 501's NAT device 503 as described in FIG. 4. Central communications station 103 also receives from communications system 501 its next TCP connection information, which includes its next TCP port (e.g., 1234), sequence ID, etc., that may be used later to establish a new TCP connection with communications system 501 (see packet 505).

When communications system 502 initiates, through its NAT device 506, a full TCP connection 507 with central communications station 103, central communications station 103 obtains from system 502 its connection information, which includes its translated IP address (e.g., 4.4.4.4) provided by communications system 502's NAT device 504. Communications system 502 also sends to central communications station 103 its next TCP connection information (e.g., next port=3456) as communications system 501 has done (see packet 508). Central communications station 103, at this point, sends the translated IP address and the next TCP connection information of each remote communications system to the other remote communications system (see packets 509 and 510).

Refer now to FIG. 5B. After receiving communications system 502's connection information from central communications station 103 as described above, communications system 501 attempts to initiate a normal TCP connection, as described in FIG. 4, with communications system 502 by directing a control packet (e.g., control packet 511) with a SYN flag to communications system 502's NAT 506 according to the received connection information (translated IP address, next TCP port, sequence ID, etc.). Before sending the SYN-flagged control packet, communications system 501's NAT device 503 substitutes a translated public IP address as the source IP for the control packet and creates a port mapping in its NAT table, as described in FIG. 3, waiting for acknowledgment from communications system 502. This control packet, however, will not be accepted by communications system 502's firewall. This is because both communications systems' firewalls, as describer above, only permit connections initiated from within the firewalls and will not accept connection requests initiated from the open data network.

Despite the fact that communications system 502 never received the control packet requesting connection from communications system 501, it will nonetheless be able to acknowledge communications system 501's request because central communications station 103 has previously forwarded communications system 501's next TCP connection information to it. Using the forwarded connection information, communications system 502 unilaterally sends a control packet (e.g., control packet 512) with an ACK-SYN flag acknowledging communications system 501's connection request to communications system 501's NAT 503.

This time, communications system 501's NAT device 503 accepts communications system 502's control packet and directs it to communications system 501 based on the port mapping that it has waiting for this acknowledgment in its NAT table. Upon receiving communications system 502's acknowledgment, communications system 501 can now send the final acknowledgment control packet required for the three-way TCP handshake back to communications system 502. Communications system 502's NAT device 504 accepts this final ACK-flagged control packet because a port mapping has been created in its NAT table waiting for this acknowledgment when it sent its control packet requesting connection to communications system 501 earlier. Thus, the three-way TCP handshake is completed. Central communications station is again free to bow out and let communications systems 501 and 502 directly communicate with each other.

Because communications system 501's initial request for TCP connection with communications system 502 (SYN) may time out before communications system 502 has had a chance to respond, communications system 501 may periodically resend the requesting control packet (SYN) until a response is received from communications system 502.

It will be understood by one skilled in the art that while communications system 501 is described above as the system that initiates a new TCP handshake with communications system 502, in practice, either communications systems 501 or 502 may initiate the new TCP handshake once it receives the appropriate next TCP connection information of the other communications system from central communications station 103. It will also be understood by one skilled in the art that while the above description requires only one communications system to send the initial SYN-flagged control packet to the other communications system, which unilaterally responds with an ACK-SYN flagged control packet, in an embodiment where a communications system is unable to send an ACK-flagged control packet without having first sent a SYN-flagged control packet, both communications system may send a SYN-flagged control packet to the other communications system in a symmetrical process before proceeding according to the description above.

Figure 6A:
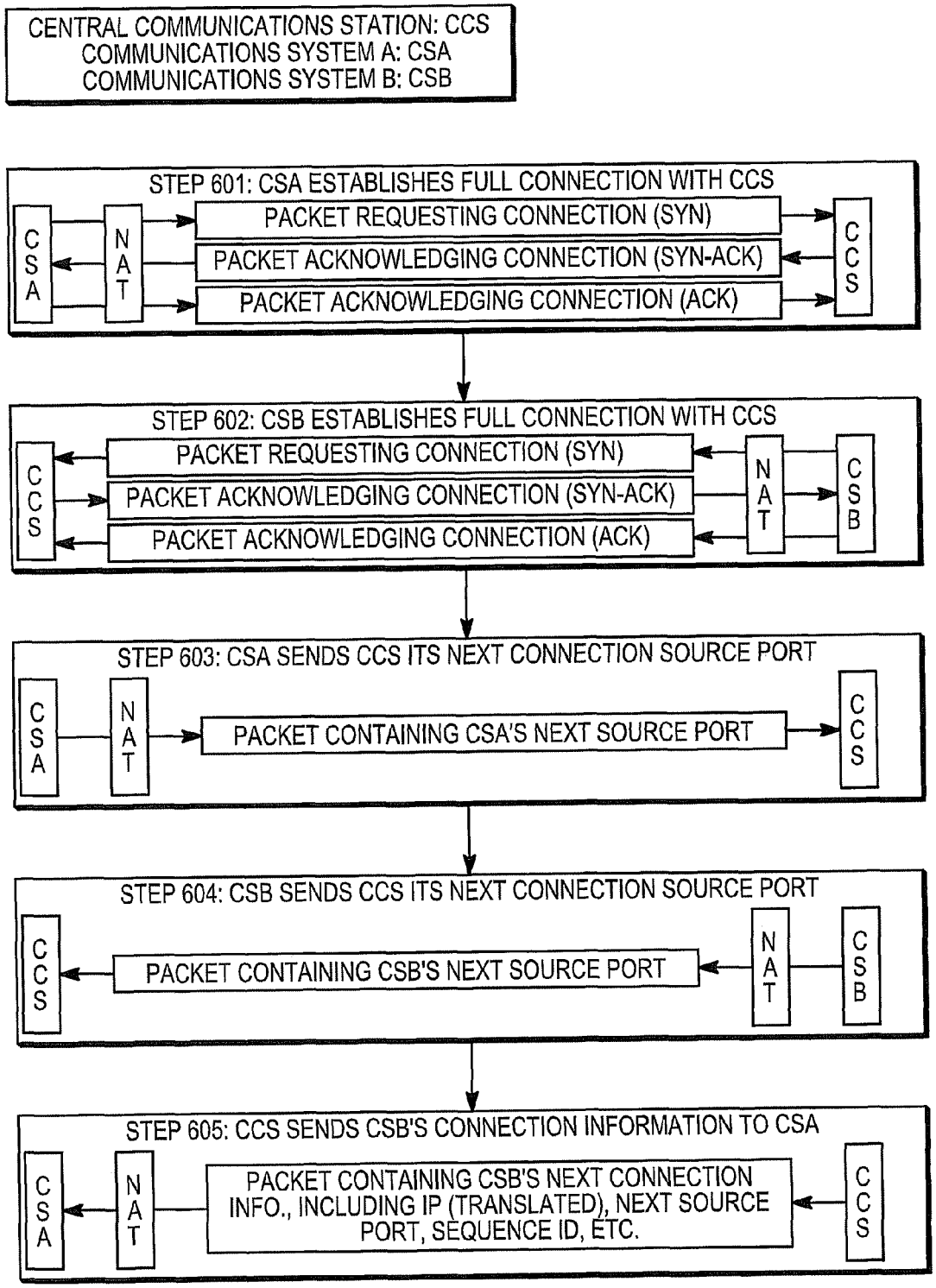
FIGS. 6A and 6B show steps illustrating data exchanges among two remote communications systems and a central communications station in establishing a direct TCP connection between the remote communications systems according to the invention.
Figure 6B:
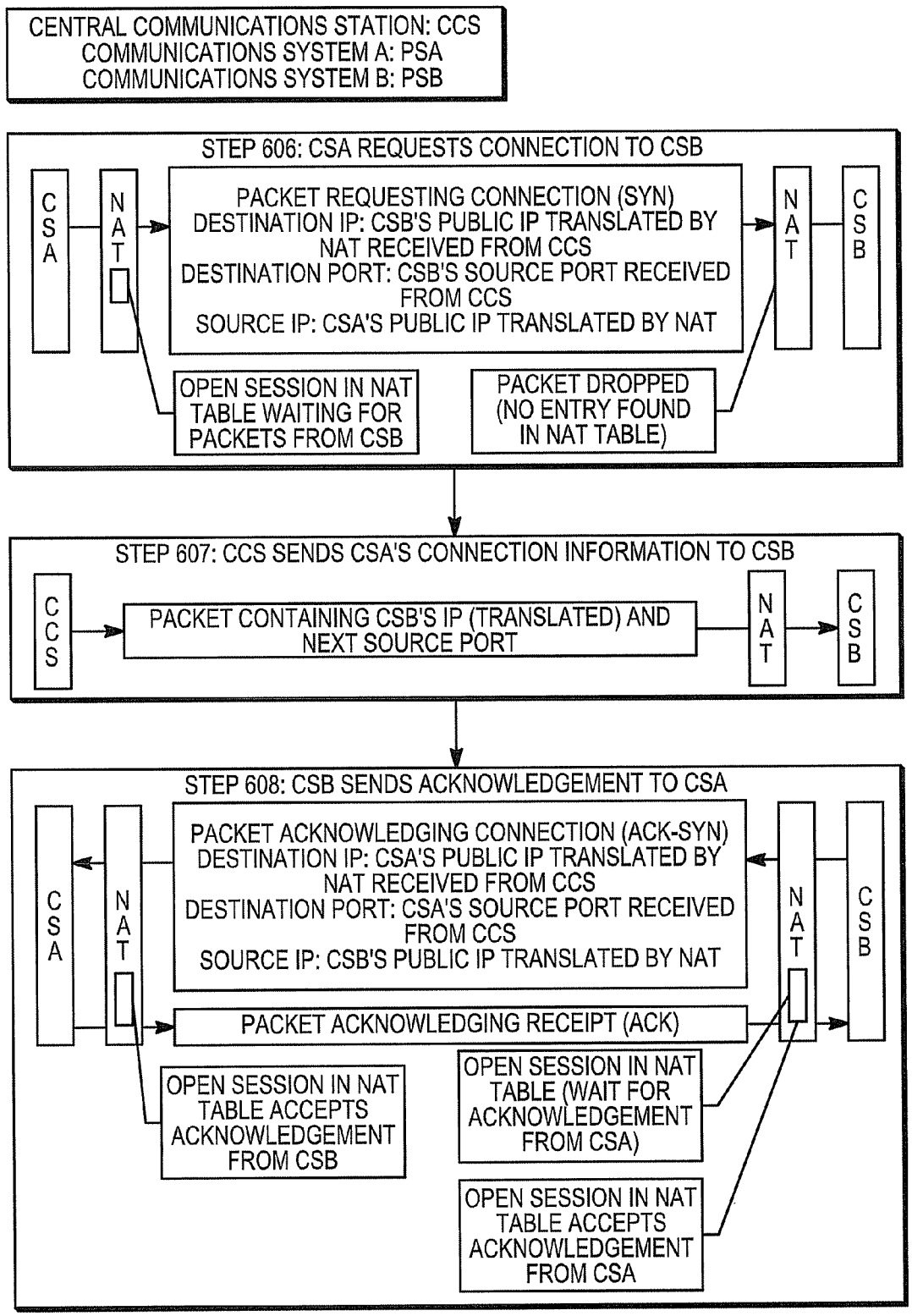

FIGS. 6A and 6B show a flowchart comprising steps illustrating data exchanges among two communications systems (CSA and CSB) and a central communications station (CCS) in establishing a direct TCP connection between the communications systems as described in connection with FIGS. 5A and 5B above. At step 601, CSA, through its NAT device, initiates and completes a three-way TCP handshake with CCS (SYN-ACK/SYN-ACK) thereby establishing full TCP connection with CCS. At step 602, CSB, through its NAT device, also independently establishes full TCP connection with CCS (SYN-ACK/SYN-ACK).

At step 603, CSA sends to CCS, via its existing TCP connection with CCS (established at step 601), connection information for its next TCP connection, which includes CSA's next TCP source port, sequence ID, etc. Similarly, CSB, at step 604, also sends CCS, via its existing TCP connection with CCS (established at step 602), connection information for its next TCP connection, which includes CSB's next TCP source port, sequence ID, etc.

At step 605, CCS forwards to CSA, via its existing TCP connection with CSA (step 601), connection information for establishing a new TCP connection with CSB, which includes CSB's NAT-translated public IP address, CSB's next TCP source port (received from CCS at step 604), sequence ID (received at step 604), etc.

Refer now to step 606 of FIG. 6B, CSA, upon receiving the necessary connection information to establish a new TCP connection with CSB (step 605), directs a control packet requesting TCP connection (SYN) to CSB at step 606. CSA's requesting control packet uses as its destination IP address and port, CSB's NAT-translated public IP address and CSB's next TCP source port that it has received from CCS (step 605). Upon sending this control packet, CSA's NAT substitutes a translated public IP address as its source IP. CSA's NAT also creates a port mapping in its NAT table that enables the NAT to route CSB's return control packet to CSA (see FIG. 3). CSB's NAT, however, drops CSA's control packet because, as previously mentioned, CSB's firewall only allows for connections that are initiated from within the firewall and not from the external network.

This is solved, when CCS, at step 607, forwards CSA's next TCP connection information (CSA's translated public IP address, next TCP connection port, sequence id, etc.), that it has received from CSA at step 603, to CSB via its existing TCP connection with CSB (step 602). Step 607 effectively informs CSB that CSA is trying to establish a new TCP connection with it and also gives CSB the necessary connection information for CSB to direct Packets to CSA. Upon receiving CSA's next connection information from CCS, CSB, never having received CSA's TCP connection request, unilaterally directs a control packet flagging ACK-SYN to CSA to complete the second step in the three-way TCP handshake (see FIG. 4) at step 608. CSB's NAT substitutes a translated public IP address as the source IP for the outbound control packet and creates a record in its NAT table, which enables the NAT to route return packets from CSA to CSB.

CSA's NAT accepts CSB's packet as it has previously created a record in its NAT table when CSA sent its initial TCP connection request (SYN) to CSB (606), which now allows it to route return packets from CSB to CSA. CSA, upon receiving CSB's packet (ACK-SYN), sends the final acknowledgment control packet (ACK) back to CSB. CSB's NAT, having sent the ACK-SYN-flagged control packet to CSA, now also has a record in its NAT table, which allows it to route CSA's final ACK-falgged control packet to CSB. At this point, the three-way TCP handshake is completed and a direct full TCP connection is established between CSA and CSB.

As briefly discussed in connection with FIG. 5B, CSA's initial request to CSB at step 606 may time out if CSA does not receive a control packet acknowledging its connection request from CSB. To maintain an open session that will allow CSA's NAT to route CSB's return control packet to CSA, CSA may repeat step 606 periodically until a return acknowledgment packet is received from CSB.

Also as mentioned in connection with FIGS. 5A and 5B, either CSA or CSB may initiate the three way TCP handshake by sending the SYN-flagged control packet to the other as described in step 606. In an embodiment where either or both of CSA and CSB are restricted from unilaterally sending an ACK-SYN flagged control packet without having first initiated a new TCP connection by sending a SYN-flagged control packet, the restricted communications system may first send a SYN-flagged control packet before sending an ACK-SYN flagged control packet to the other communications system. In other words, in such an embodiment, regardless of whether the other communications system has sent a SYN-flagged control packet to it, the restricted communications system may consecutively send out a SYN-flagged control packet and an ACK-SYN-flagged control packet to the other communications system. For convenience, both communications systems may be configured to always send out a SYN-flagged control packet before sending an ACK-SYN-flagged control packet in a symmetrical process to prevent any potential problems.

Such an arrangement, in which both communications systems independently initiates a TCP handshake with the other communications system in a symmetrical process (by sending a SYN-flagged control packet and an ACK-SYN flagged control packet), further enables the above communications scheme, which has been designed to work with NAT, to also work when one of the communications systems is behind a NAPT device.

As described in connection with FIG. 6A, before each communications system can initiate a new TCP handshake with the other communications system, it must first receive from central communications station the next TCP connection information of the other communications system, which includes the other communications system's port address for its next TCP connection.

When one of the communications systems is behind a NAPT device, which translates port addresses as well as IP addresses, it is difficult for that communications system to know how its port address will be translated by the NAPT device. This difficulty makes that communications system unable to provide accurate information about its next TCP connection port address to the central communications station to forward to the other communications system. This will cause any packets (including the ACK-SYN flagged control packet) sent to the communications system behind the NAPT device by the other communications system to be dropped, because the destination port addresses of those packets will not match the port addresses in the table of the NAPT device. However, because the other communications system is not also behind a NAPT device and thus was able to provide its correct port address for a new TCP connection to the central communications station to be forwarded to the communications system behind the NAPT device, a new TCP connection can still be established when the communications system behind the NAPT device sends an ACK-SYN flagged control packet to the other communications system at the correct port address provided.

Therefore, by requiring both communications systems to independently send to each other SYN and ACK-SYN flagged control packets in a symmetrical process, establishment of a new TCP connection between the two communications systems can be ensured as long as one of the communications system is not behind a NAPT device (only a NAT device).

Thus it is seen that a secure communications scheme is provided that enables two secure communications systems to directly communicate with each other. One skilled in the art will appreciate that the present invention can be practiced by other than the described embodiments, which are presented for purposes of illustration and not of limitation, and the present invention is limited only by the claims that follow.

What is claimed is:

1. A method for enabling a first communications system and a second communications system, said method comprising:

the said first and second communications systems respectively located behind a first firewall and a second firewall, to directly communicate with each other,
  wherein said first firewall prevents communication initiated from an external data network from reaching said first communications system and said second firewall prevents communication initiated from said external data network from reaching said second communication system;

establishing a first secure connection via said external data network between said first communications system and a central communications station through said first firewall, wherein said first secure connection is initiated by said first communications system thereby being allowed to pass through said first firewall;

establishing a second secure connection via said external data network between said second communications system and said central communications station through said second firewall, wherein said second secure connection is initiated by said second communications system thereby being allowed to pass through said second firewall;

forwarding connection information for said second communications system to said first communications system via said first secure connection using said central communications station; and transmitting data directly from said first communications system to said second communications system, wherein said data uses said connection information for said second communications system as destination information and uses connection information for said central communications station as source information, said data originating from said first communications system appearing to originate from said central communications station, wherein said connection information for said second communications system includes an Internet protocol address and port of said second communications system and wherein said connection information for said central communications station includes an Internet protocol address and port of said central communications station.

2. The method of claim 1 further comprising:

forwarding connection information for said first communications system to said second communications system via said second secure connection using said central communications station; and transmitting data from said second communications system to said first communications system, wherein said data uses said connection information for said first communications system as destination information and uses connection information for said central communications station as its source information, said data originating from said second communications system appearing to originate from said central communications station.

3. The method of claim 2 wherein said connection information for said first communications system includes Internet protocol address and port of said first communications system.

4. A method for enabling a first communications system and a second communications system, said method comprising:

the said first and second communication systems respectively located behind a first firewall and a second firewall and having respective associated first and second network address translation devices, to directly communicate with each other, wherein each of said first firewall prevents communication initiated from an external data network from reaching said first communications system and said second firewall prevents communication initiated from an external data network from reaching said second communications system and wherein each of said first and second network address translation devices respectively provides public source information for outbound data originated from said first and second communications systems;

establishing a first secure connection via an external data network between said first communications system and a central communications station through said first firewall, wherein said first secure connection is initiated by said first communications system thereby being allowed to pass through said first firewall;

establishing a second secure connection via said external data network between said second communications system and said central communications station through said second firewall, wherein said second secure connection is initiated by said second communications system thereby being allowed to pass through said second firewall;

transmitting first connection information for establishing a new connection with said first communications system, said transmitting being from said first communications system to said central communications station via said first secure connection;

transmitting second connection information for establishing a new connection with said second communications system, said transmitting being from said second communications system to said central communications station via said second secure connection;

forwarding said second connection information system to said first communications system via said first secure connection using said central communications station;

transmitting a connection request from said first communications system to said second communications system wherein said connection request uses said second connection information as its second communications system destination information;

forwarding said first connection information to said second communications system via said second secure connection using said central communications station;

transmitting a connection acknowledgement and request from said second communications system to said first communications system wherein said connection acknowledgement and request uses said first connection information as first communications system destination information; and in response to receiving said connection acknowledgement and request from said second communications system, transmitting a connection acknowledgement directly from said first communications system to said second communications system, wherein:

said first connection information includes a public Internet protocol address provided by said first network address translation device and port for said first communications system's next connection; and said second connection information includes a public Internet protocol address provided by said second network address translation device and port for said second communications system's next connection.

5. A system for enabling a first communications system and a second communications system, said system comprising:

a processor;

the said first and second communication systems respectively located behind a first firewall and a second firewall, to directly communicate with each other, wherein said first firewall prevents communication initiated from an external data network from reaching said first communications system and said second firewall prevents communication initiated from said external data network from reaching said second communication system;

means for establishing a first secure connection via said external data network between said first communications system and a central communications station through said first firewall, wherein said first secure connection is initiated by said first communications system thereby being allowed to pass through said first firewall;

means for establishing a second secure connection via said external data network between said second communications system and said central communications station through said second firewall, wherein said second secure connection is initiated by said second communications system thereby being allowed to pass through said second firewall;

means for forwarding connection information for said second communications system to said first communications system via said first secure connection using said central communications station; and means for transmitting data directly from said first communications system to said second communications system, wherein said data uses said connection information of-for said second communications system as destination information and uses connection information for said central communications station as source information originated said data originating from said first communications system appearing to originate from said central communications station, wherein said connection information for said second communications system includes an Internet protocol address and port of said second communications system and wherein said connection information for said central communications station includes an Internet protocol address and port of said central communications station.

6. The system of claim 5 further comprising:

means for forwarding connection information for said first communications system to said second communications system via said second secure connection using said central communications station; and means for transmitting data from said second communications system to said first communications system, wherein said data uses said connection information of said first communications system as destination information and uses said connection information of said central communications station as source information, said data originating from said second communications system appearing to originate from said central communications station.

7. The system of claim 6 wherein said connection information for said first communications system includes Internet protocol address and port of said first communications system.

8. A system for enabling a first communications system and a second communications system, said system comprising:

the first and second communication systems respectively located behind a first firewall and a second firewall and having respective associated first and second network address translation devices, to directly communicate with each other, wherein said first firewall prevents communication initiated from an external data network from reaching said first communications system and said second firewall prevents communication initiated from an external data network from reaching said second communications system and wherein each of said first and second network address translation devices respectively provides public source information for outbound data originated from said first and second communications systems;

means for establishing a first secure connection via an external data network between said first communications system and a central communications station through said first firewall, wherein said first secure connection is initiated by said first communications system thereby being allowed to pass through said first firewall;

means for establishing a second secure connection via said external data network between said second communications system and said central communications station through said second firewall, wherein said second secure connection is initiated by said second communications system thereby being allowed to pass through said second firewall;

means for transmitting first connection information for establishing a new connection with said first communications system, said transmitting being from said first communications system to said central communications station via said first secure connection;

means for transmitting second connection information for establishing a new connection with said second communications system, said transmitting being from said second communications system to said central communications station via said second secure connection;

means for forwarding said second connection information to said first communications system via said first secure connection using said central communications station;

means for transmitting a connection request from said first communications system to said second communications system wherein said connection request uses said second connection information second communications system destination information;

means for forwarding said first connection information to said second communications system via said second secure connection using said central communications station;

means for transmitting a connection acknowledgement and request from said second communications system to said first communications system wherein said connection acknowledgement and request uses said first connection information for as first communications system destination information; and means for transmitting a connection acknowledgement directly from said first communications system to said second communications system in response to receiving said connection acknowledgement and request from said second communications system wherein:

said first connection information includes a public Internet protocol address provided by said first network address translation device and port for said first communications systems next connection; and said second connection information includes a public Internet protocol address provided by said second network address translation device and port for said second communications system's next connection.

9. A system for enabling two communications system, located behind firewalls, to directly communicate with each other, said system comprising:

a central communications station;

a first communications system and a second communications system, wherein each of said first and second communications system comprises a respective secure connection interface that establishes a secure connection with said central communications station via an external data network through a network access;

a first firewall and a second firewall respectively located between said external data network and said first and second communications systems, wherein said first firewall prevents communication initiated from said external data network from reaching said first communications system and said second firewall prevents communication initiated from said external data network from reaching said second communications system; and said central communications station comprises:

a secure connection interface that maintains secure connections with said first and second communications systems via said external communications network through a network access, and a secure redirector that forwards connection information for said second communications system to said first communications system via said secure connection with said first communications system thereby enabling said first communications system to transmit data directly to said second communications system, wherein said data uses said connection information for said second communications system as destination information and uses connection information for said central communications station as source information said data originating from said first communications system appearing to originate from said central communications station wherein said connection information for said second communications system includes an Internet protocol address and port of said second communications system and wherein said connection information for said central communications station includes an Internet protocol address and port of said central communications station.

10. The system of claim 9, wherein said secure redirector additionally forwards connection information for said first communications system to said second communications system via said secure connection with said second communications system thereby enabling said second communications system to transmit data to said first communications system, wherein said data uses said connection information of said first communications system as destination information and uses connection information of said central communications station as source information, said data originating from said second communications system appearing to originate from said central communications station.

11. The system of claim 10 wherein said connection information for said first communications system includes Internet protocol address and port of said first communications system.

12. A system for enabling two communications system, located behind firewalls and having associated network translation devices, to directly communicate with each other; said system comprising:

a central communications station;

a first communications system and a second communications system, wherein each of said first and second communications system comprises:

a respective secure connection interface that establishes a secure connection with said central communications station via an external data network through a network access, and a respective transmitter that transmits first connection information for establishing a new connection with said first communications system to said central communications station via said secure connection and transmits second connection information for establishing another new connection with said second communications system to said central communications station via said secure connection;

a first firewall and a second firewall respectively located between said external data network and said first and second communications systems, wherein said first firewall prevents communication initiated from said external data network from reaching said first communication system and said second firewall prevents communication initiated from said external data network from reaching said second communications system; and a first network address translation device and a second network address translation device respectively associated with said first and second communications systems, wherein each of said first and second network address translation devices respectively provides public source information for outbound data originated from said first and second communications systems, wherein:

said central communications station comprises: a secure connection interface that maintains secure connections with said first and second communications systems via said external communications network through a network access, and a secure redirector that:

forwards said second connection information to said first communications system via said secure connection with said first communications system thereby enabling said first communications system to transmit a connection request to said second communications system wherein said connection request uses said second connection information as second communications system destination information, and forwards said first connection information to said second communications system via said secure connection with said second communications system, thereby:

enabling said second communications system to transmit a connection acknowledgement and request from said second communications system to said first communications system wherein said connection acknowledgement and request uses said first connection information as first communications system destination information, and enabling said first communications system to transmit a connection acknowledgement directly from said first communications system to said second communications system, wherein:

said first connection information includes a public Internet protocol address provided by said first network address translation device and port for said first communications system's next connection; and said second connection information said second connection information includes a public Internet protocol address provided by said second network address translation device and port for said second communications system's next connection.

13. A central communications station for enabling a first communications system and a second communications system said central communications station comprising:

a processor;

the first and second communication systems respectively located behind a first firewall and a second firewall, to directly communicate with each other, wherein said first firewall prevents communication initiated from an external data network from reaching said first communications system and said second firewall prevents communication initiated from an external data network from reaching said second communications system;

means for maintaining a first secure connection with said first communications system via said external data network through said first firewall, wherein said first secure connection is initiated by said first communications system thereby being allowed to pass through said first firewall;

means for maintaining a second secure connection with said second communications system via said external data network through said second firewall, wherein said second secure connection is initiated by said second communications system thereby being allowed to pass through said second firewall; and means for forwarding connection information for said second communications system to said first communications system via said first secure connection thereby enabling said first communications system to transmit data to said second communications system, wherein said data uses said connection information of-for said second communications system as its destination information and uses connection information for said central communications station as source information, said data originating from said first communications system appearing to originate from said central communications station, wherein said connection information for said second communications system includes an Internet protocol address and port of said second communications system and wherein said connection information for said central communications station includes an Internet protocol address and port of said central communications station.

14. The central communications station of claim 13 further comprising:

means for forwarding connection information for said first communications system to said second communications system via said second secure connection thereby enabling said second communications system to transmit data to said first communications system, wherein said data uses said connection information of said first communications system as destination information and uses connection information for said central communications station as source information, said data originating from said second communications system appearing to originate from said central communications station.

15. The central communications station of claim 14 wherein said connection information for said first communications system includes Internet protocol address and port of said first communications system.

16. A central communications station for enabling a first communications system and a second communications system said central communications station comprising:

the first and second communication systems respectively located behind a first firewall and a second firewall and having respective associated first and second network address translation devices, to directly communicate with each other, wherein said first firewall prevents communication initiated from an external data network from reaching said first communications system and said second firewall prevents communication initiated from an external data network from reaching said second communications system and wherein each of said first and second network address translation devices respectively provides public source information for outbound data originated from said first and second communications system;

means for maintaining a first secure connection via an external data network with said first communications system through said first firewall, wherein said first secure connection is initiated by said first communications system thereby being allowed to pass through said first firewall;

means for maintaining a second secure connection via said external data network with said second communications system through said second firewall, wherein said second secure connection is initiated by said second communications system thereby being allowed to pass through said second firewall;

means for obtaining first connection information for establishing a new connection with said first communications system from said first communications systems via said first secure connection;

means for obtaining second connection information for establishing another new connection with said second communications system from said second communications system via said second secure connection;

means for forwarding said second connection information to said first communications system via said first secure connection thereby enabling said first communications system to transmit a connection request to said second communications system, wherein said connection request uses said second connection information as second communications system destination information; and means for forwarding said first connection information system to said second communications system via said second secure connection, thereby:

enabling said second communications system to transmit a connection acknowledgement and request to said first communications system wherein said connection acknowledgement and request uses said first connection information system as first communications system destination information, and enabling said first communications system to transmit a connection acknowledgement directly to said second communications system in response to receiving said connection acknowledgement and request from said second communications system wherein:

said first connection information includes a public Internet protocol address provided-by said first network address translation device and port for said first communications system's next connection; and said second connection information includes a public Interact protocol address provided by said second network address translation device and port for said second communications system's next connection.

17. A central communications station for enabling a first communications system and a second communications system said central communications station comprising:

said first and second communication systems respectively located behind a first firewall and a second firewall to directly communicate with each other, wherein said first firewall prevents communication initiated from an external data network from reaching said first communications system and said second firewall prevents communication initiated from an external data network from reaching said second communications system;

a secure connection interface that maintains secure connections with said first and second communications systems through a network access to said external communications network; and a secure redirector that forwards connection information of said second communications system to said first communications system via said secure connection with said first communications system thereby enabling said first communications system to transmit data directly to said second communications system, wherein said data uses said connection information for said second communications system as destination information and uses connection information for said central communications station as source information, said data originating from said first communications system appearing to originate from said central communications station, wherein said connection information for said second communications system includes an Internet protocol address and port of said second communications system and wherein said connection information for said central communications station includes an Internet protocol address and port of said central communications station.

18. The central communications station of claim 17, wherein said secure redirector additionally forwards connection information for said first communications system to said second communications system via said secure connection with said second communications system thereby enabling said second communications system to transmit data to said first communications system, wherein said data uses said connection information of said first communications system as destination information and uses connection information for said central communications station as source information, said data originating from said second communication system appearing to originate from said central communications station.

19. The central communications station of claim 18 wherein said connection information for said first communications system includes Internet protocol address and port of said first communications system.

20. A central communications station for enabling a first communications system and a second communications system said central communications station comprising:

said first and second communication systems respectively located behind a first firewall and a second firewall and having respective associated first and second network address translation devices, to directly communicate with each other, wherein said first firewall prevents communication initiated from an external data network from reaching said first communications system and said second firewall prevents communications initiated from an external data network from reaching said second communications system and wherein each of said first and second network address translation devices respectively provides public source information for outbound data originated from said first and second communications systems;

a secure connection interface that maintains secure connections with said first and second communications systems via said external communications network through a network access; and a secure redirector that:

forwards second connection information for establishing a new connection with said second communications system to said first communications system via said secure connection with said first communications system thereby enabling said first communications system to transmit a connection request to said second communications system wherein said connection request uses said connection information second communications system destination information, and forwards first connection information for establishing a new connection with said first communications system to said second communications system via said secure connection with said second communications system, thereby:

enabling said second communications system to transmit a connection acknowledgement and request from said second communications system to said first communications system wherein said connection acknowledgement and request uses said first connection information as first communications system destination information, and enabling said first communications system to transmit a connection acknowledgement directly from said first communications system to said second communications system wherein:

said first connection information includes a public Internet protocol address provided by said first network address translation device and port for said first communications system's next connection; and said second connection information includes a public Internet protocol address provided by said second network address translation device and port for said second communications system's next connection.

* * * * *